United States Patent
Terushita et al.

(10) Patent No.: US 9,429,315 B2
(45) Date of Patent: Aug. 30, 2016

(54) METHOD AND APPARATUS OF CONTROLLING OXYGEN SUPPLY IN OXYFUEL COMBUSTION BOILER

(75) Inventors: Shuuhei Terushita, Tokyo (JP); Toshihiko Yamada, Tokyo (JP); Shuzo Watanabe, Tokyo (JP); Terutoshi Uchida, Tokyo (JP)

(73) Assignees: IHI Corporation, Tokyo (JP); ELECTRIC POWER DEVELOPMENT CO., LTD., Tokyo (JP)

( * ) Notice: Subject to any disclaimer, the term of this patent is extended or adjusted under 35 U.S.C. 154(b) by 713 days.

(21) Appl. No.: 12/920,602

(22) PCT Filed: Mar. 6, 2008

(86) PCT No.: PCT/JP2008/000474
§ 371 (c)(1),
(2), (4) Date: Dec. 13, 2010

(87) PCT Pub. No.: WO2009/110036
PCT Pub. Date: Sep. 11, 2009

(65) Prior Publication Data
US 2011/0083594 A1 Apr. 14, 2011

(51) Int. Cl.
*F23N 5/00* (2006.01)
*F23C 9/00* (2006.01)
(Continued)

(52) U.S. Cl.
CPC ............... *F23C 9/00* (2013.01); *F22B 35/002* (2013.01); *F23L 7/007* (2013.01); *F23N 5/00* (2013.01);
(Continued)

(58) Field of Classification Search
CPC .......... F23N 3/00; F23N 3/002; F23N 3/005; F23N 3/007; F23N 5/00; F23N 5/18; F23N 5/26; F23N 5/003; F23N 2021/10; F23N 2021/12; F23N 2037/16; F23N 2037/26; F23N 2037/28; F23N 2037/32; F23N 2039/02; F23L 7/00; F23L 7/007; F23L 9/00; F23L 2900/07001; F23L 2900/07003; F23L 2900/07005; F23L 2900/07006; F23B 80/02; F22B 35/002
USPC ....... 110/203, 204, 347, 348, 205, 188, 106, 110/297, 185, 345; 431/2, 4, 5
See application file for complete search history.

(56) References Cited

U.S. PATENT DOCUMENTS 3,043,525 A    7/1962   Gilbert
5,280,756 A * 1/1994   Labbe ........................ 110/191
(Continued)

FOREIGN PATENT DOCUMENTS

EP      0 773 408 A1    5/1997
JP       59 24104       2/1984
(Continued)

OTHER PUBLICATIONS
JP 59024104: English Translation. Translated by The McElroy Translation Company for the United States Patent and Trademark Office, Feb. 2014.*
(Continued)

*Primary Examiner* — Kenneth Rinehart
*Assistant Examiner* — Tavia Sullens
(74) *Attorney, Agent, or Firm* — Oblon, McClelland, Maier & Neustadt, L.L.P.

(57) ABSTRACT

Provided are a method and an apparatus of controlling an oxygen supply in an oxyfuel combustion boiler capable of attaining stable oxyfuel combustion even when properties of coal are changed. A boiler-brought-in oxygen density is obtained when coal with a fuel ratio measured by fuel measuring means 39 is burned stably with oxygen in a boiler 4 so that a relationship between the fuel ratio and/or carbon content of the coal and the boiler-brought-in oxygen density is obtained and inputted in advance into the controller. When the coal is changed to the new kind of coal, a total amount of gases recirculated is regulated such that a boiler-brought-in oxygen density becomes accordance with a fuel ratio and/or a carbon content which is measured in advance for the new kind of coal.

12 Claims, 6 Drawing Sheets

(51) Int. Cl.
*F23L 7/00* (2006.01)
*F22B 35/00* (2006.01)

(52) U.S. Cl.
CPC ............... *F23L 2900/07003* (2013.01); *F23L 2900/07006* (2013.01); *F23N 2021/10* (2013.01); *Y02E 20/344* (2013.01)

(56) References Cited

U.S. PATENT DOCUMENTS

| | | | |
|---|---|---|---|
| 5,764,535 | A | 6/1998 | Okazaki et al. |
| 6,116,171 | A * | 9/2000 | Oota et al. ............... 110/263 |
| 6,771,368 | B1 * | 8/2004 | Chadwick ............... 356/318 |
| 6,935,251 | B2 | 8/2005 | Marin et al. |
| 7,756,591 | B2 * | 7/2010 | Jia et al. ............... 700/29 |
| 2007/0034704 | A1 | 2/2007 | Hu et al. |
| 2008/0286707 | A1 * | 11/2008 | Panesar et al. ............... 431/10 |
| 2009/0031933 | A1 | 2/2009 | Ookawa et al. |
| 2009/0272300 | A1 | 11/2009 | Yamada et al. |
| 2011/0220037 | A1 | 9/2011 | Hu et al. |

FOREIGN PATENT DOCUMENTS

| | | | |
|---|---|---|---|
| JP | S5924104 A * | 2/1984 | ............... F23C 99/00 |
| JP | 59 42452 | 3/1984 | |
| JP | 03221830 A * | 9/1991 | ............... G01N 1/22 |
| JP | 4-244504 A | 9/1992 | |
| JP | 5 26409 | 2/1993 | |
| JP | 5-168853 A | 7/1993 | |
| JP | 5-172305 A | 7/1993 | |
| JP | 5-231609 A | 9/1993 | |
| JP | 6 94212 | 4/1994 | |
| JP | 6 101809 | 4/1994 | |
| JP | 7-318016 A | 12/1995 | |
| JP | 3053914 B2 | 6/2000 | |
| JP | 2001-235103 A | 8/2001 | |
| JP | 2001-336736 A | 12/2001 | |
| JP | 2004 69251 | 3/2004 | |
| JP | 2007 147162 | 6/2007 | |
| WO | WO 2007/061106 A1 | 5/2007 | |

OTHER PUBLICATIONS

Extended European Search Report issued May 15, 2012, in European Patent Application No. 08720360.0.
Kather, Hermsdorf, Klostermann: "Der Kohlebefeuerte Oxyfuel-Prozess", XP-002675101, Apr. 30, 2007, pp. 84-91.
Dunker R: "Brennertechnik mit neuem Freiheitsgrad", vol. 59, No. 3, XP-001504848, Jan. 1, 2007, pp. 51-54.

* cited by examiner (a)

(b)

METHOD AND APPARATUS OF CONTROLLING OXYGEN SUPPLY IN OXYFUEL COMBUSTION BOILER

TECHNICAL FIELD

The present invention relates to a method and an apparatus of controlling oxygen supply in an oxyfuel combustion boiler.

BACKGROUND ART

An increased carbon dioxide ($CO_2$) density in the atmosphere has proved to be one of major factors of global warming which has recently come into attention as a global-scale environmental problem. A thermal power plant appears close-up as a fixed source of exhausting these substances. Fuel for thermal power generation may be oil, natural gas and coal, among which coal is especially anticipated to have a large future demand due to its greater potential reserves.

Coal contains a higher percentage of carbon as compared with natural gas and oil, together with other components such as hydrogen, nitrogen and sulfur and ash as an inorganic component. Therefore, when coal is burned in the air, most of the composition of the exhaust gas is occupied by nitrogen (about 70%), with the remainder occupied by carbon dioxide $CO_2$, sulfur oxide $SO_x$, nitrogen oxide $NO_x$, oxygen (about 4%), unburned combustibles and particles such as ash. The exhaust gas is thus subjected to exhaust gas treatments such as denitration, desulfurization and dedusting so that $NO_x$, $SO_x$ and particulates fall under their respective environmental emission standard values before the emission to the atmosphere through a stack.

$NO_x$ occurring in the exhaust gas divides into a thermal $NO_x$ generated from oxidization of nitrogen in the air by oxygen and a fuel $NO_x$ generated as a result of oxidization of nitrogen in the fuel. Up until now, a combustion method of lowering the flame temperature has been employed for reduction of the thermal $NO_x$, whereas another combustion method of forming a fuel-excess region for deoxidizing $NO_x$ within a boiler has been employed for reduction of the fuel $NO_x$.

In case of using a fuel such as coal containing sulfur, a wet or dry desulfurizing device has been provided to remove $SO_x$ occurring in the exhaust gas as a result of the combustion.

It is desired on the other hand that a large amount of carbon dioxide generated in the exhaust gas be also separated and captured at a high efficiency. A possible method of capturing carbon dioxide contained in the exhaust gas has hitherto been reviewed which includes a method of using an amine or other absorbing liquid to absorb it, an adsorption method of using a solid adsorbent to adsorb it or a membrane separation method, all of which have a low conversion efficiency, thus not yet reaching a practical use level of the $CO_2$ capture from a coal burning boiler.

Accordingly, a technique of burning a fuel with oxygen instead of air has been proposed as an effective technique to address at one time both the problem of the separation of carbon dioxide in the exhaust gas and the problem of the reduction of the thermal $NO_x$ (see, e.g., Patent Literatures 1 and 2).

When coal is burned with oxygen, generation of the thermal $NO_x$ is not seen and most of the exhaust gas is occupied by carbon dioxide with the remainder occupied by other gases containing the fuel $NO_x$, $SO_x$ and unburned combustibles, consequently achieving a relatively easy liquefaction and separation of the carbon dioxide through cooling of the exhaust gas.

[Patent Literature 1] JP 5-231609A
[Patent Literature 2] JP 3053914B

SUMMARY OF INVENTION

Technical Problems

In a conventional air combustion boiler, stable combustion in its burner is facilitated by controlling a weight ratio (A/C) of an amount of a primary air as carrier air for pulverized coal produced by a mill to an amount of pulverized coal from the mill. Flame may be blown off when the A/C is too high while stable combustion cannot be kept from the structure of the mill-burner system when the A/C is too low. Thus, the A/C is set and controlled within a predetermined range for the operation according to the boiler.

In order to reduce the fuel $NO_x$, a combustion method has been employed in which a portion of the exhaust gas is recirculated to the boiler so as to form in the burner an insufficient-air area for deoxidization of $NO_x$.

However, in case of an oxyfuel combustion boiler as disclosed in Patent Literatures 1 and 2, the primary air is not taken in due to a difference in the combustion system from the conventional air combustion, so that the A/C cannot remain intact as an indicator for the stable combustion by the burner, dissimilar to the existing air combustion boiler.

Moreover, it is difficult to always introduce and burn coal uniform in properties and therefore, an oxyfuel combustion boiler which copes with many kinds of coal is required. Coal properties range wide and, accordingly, shape of flames formed by a burner, heat absorption of a boiler and properties of exhaust gas differ significantly from those of the combustion with air when the properties of the coal vary.

Thus, establishment has been desired of an operation index with which stable combustion with oxygen can be executed even when the fuel ratio or the carbon content representing the properties of coal is varied.

The invention was made in view of the above and has its object to provide a method and an apparatus of controlling oxygen supply in an oxyfuel combustion boiler, capable of providing stable combustion with oxygen even when the properties of coal are varied.

Solution to Problems

The invention is directed to a method of controlling oxygen supply in an oxyfuel combustion boiler wherein a portion of an exhaust gas recirculated is introduced into a mill as primary recirculated exhaust gas; pulverized coal pulverized by said mill is supplied to a burner of the boiler by the primary recirculated exhaust gas; another portion of the exhaust gas recirculated is supplied to a wind box of the boiler as secondary recirculated exhaust gas; the rest of the exhaust gas recirculated is supplied to an OAP as OAP recirculation exhaust gas; a portion of oxygen produced by an air separation unit is supplied to the primary recirculated exhaust gas as primary oxygen; another portion of the oxygen is supplied to the secondary recirculated exhaust gas as secondary oxygen; yet another portion of the oxygen is supplied to the OAP recirculation exhaust gas as OAP supplied oxygen; and the rest of the oxygen is supplied directly to the burner as directly supplied oxygen, said method comprising obtaining in advance a relationship between a fuel ratio and/or a carbon content of coal on one hand and a boiler-brought-in oxygen density and/or a rate of the directly supplied oxygen to a total oxygen amount on the other hand upon stable combustion of the coal with oxygen; and regulating a total amount of the gases recirculated and/or a supply of the directly supplied oxygen such that a boiler-brought-in oxygen density and/or a rate of the directly supplied oxygen to the total oxygen amount becomes accordance with a fuel ratio and/or a carbon content which is measured in advance for a new kind of coal when the coal is changed to the new kind of coal.

In the method of controlling oxygen supply in the oxyfuel combustion boiler, preferably, a supply of the OAP supplied oxygen to the OAP recirculation exhaust gas is controlled such that an amount of unburned combustibles is maintained at a value lower than an unburned combustibles limit value and that a $NO_x$ density is maintained at a value lower than a $NO_x$ limit value.

In the method of controlling oxygen supply in the oxyfuel combustion boiler, preferably, a supply of the primary oxygen to the primary recirculated exhaust gas is regulated for stable combustion in the burner, and a supply ratio of a supply of the secondary oxygen to the secondary recirculated exhaust gas to a supply of the directly supplied oxygen to the burner is regulated to control a shape of flames in the burner.

In the method of controlling oxygen supply in the oxyfuel combustion boiler, it is preferable that, when the flames in the burner are unstable, executed is at least one of: an operation of increasing the supply of the primary oxygen to the primary recirculated exhaust gas; an operation of reducing the supply of the OAP supplied oxygen to the OAP recirculation exhaust gas to increase a burner-brought-in oxygen density; an operation of increasing a supply of the directly supplied oxygen; and operation of decreasing the total amount of gases recirculated to increase the boiler-brought-in oxygen density.

The invention is directed to an apparatus of controlling oxygen supply in an oxyfuel combustion boiler having a primary recirculation line for introduction of a portion of an exhaust gas taken out by a recirculation branch line to a mill as primary recirculated exhaust gas and for supply of pulverized coal pulverized by the mill to a burner of the boiler using the primary recirculated exhaust gas, a secondary recirculation line for supply of another portion of the exhaust gas recirculated to a wind box of the boiler as secondary recirculated exhaust gas, an OAP recirculation line for supply of the rest of the exhaust gas recirculated to an OAP as OAP recirculation exhaust gas, an air separation unit, a primary oxygen mixing line for supply of a portion of oxygen produced by the air separation unit to said primary recirculation line as primary oxygen, a secondary oxygen mixing line for supply of another portion of the oxygen to the secondary recirculation line as secondary oxygen, an OAP oxygen mixing line for supply of yet another portion of the oxygen to the OAP recirculation line as OAP supplied oxygen, a direct oxygen feed line for supply of the rest of the oxygen directly to the burner as directly supplied oxygen, a total gas amount regulator provided for the recirculation branch line, a primary oxygen regulator provided for the primary oxygen mixing line, a secondary oxygen regulator provided for the secondary oxygen mixing line, an OAP oxygen regulator provided for the OAP oxygen mixing line, a direct oxygen regulator provided for the direct oxygen feed line, unburned combustible measuring means for measurement of unburned combustibles in the exhaust gas, a $NO_x$ density monitor for measurement of a $NO_x$ density in the exhaust gas at a boiler outlet and fuel measuring means for measurement of a fuel ratio and/or a carbon content of coal to be burned, said apparatus comprising a controller, a boiler-brought-in oxygen density and/or a rate of the directly supplied oxygen to a total oxygen amount being obtained when the coal with the fuel ratio and/or the carbon content thereof measured by the fuel measuring means is burned stably with oxygen in the boiler so that a relationship between the fuel ratio and/or carbon content of the coal on one hand and the boiler-brought-in oxygen density and/or the rate of the directly supplied oxygen to the total oxygen amount on the other hand is obtained and inputted in advance into the controller, said controller regulating, when the kind of coal is changed to a new one, a total amount of the gases and/or a supply of the directly supplied oxygen such that the boiler-brought-in oxygen density and/or the rate of the directly supplied oxygen to the total oxygen amount becomes accordance with the fuel ratio and/or carbon content which is measured in advance by the fuel measuring means for the new coal.

In the apparatus of controlling oxygen supply in an oxyfuel combustion boiler, preferably, the controller is adapted to regulate the OAP oxygen regulator to control the supply of the OAP supplied oxygen to the recirculation line such that the amount of the unburned combustibles measured by the unburned combustible measuring means is maintained at a value lower than an unburned combustible limit value and that the $NO_x$ density measured by the $NO_x$ density monitor is maintained at a value lower than a $NO_x$ limit value.

In the apparatus for controlling oxygen supply of an oxyfuel combustion boiler, preferably, the controller is adapted to regulate the primary oxygen regulator to control the supply of the primary oxygen to the primary recirculation line to thereby stabilize the combustion in the burner and is adapted to regulate a supply ratio of the supply of the secondary oxygen to the secondary recirculation line regulated by the secondary oxygen regulator and the supply of the directly supplied oxygen to the burner regulated by the direct oxygen regulator to thereby control a shape of flames in the burner.

In the apparatus of controlling oxygen supply of the oxyfuel combustion boiler, preferably, when the flames in the burner are unstable, the controller is adapted to execute at least one of: an operation of regulating the primary oxygen regulator to increase the supply of the primary oxygen to the primary recirculation line; an operation of regulating the OAP oxygen regulator to reduce the supply of the OAP supplied oxygen to the OAP recirculation line to thereby increase the burner-brought-in oxygen density; an operation of regulating the directly-supplied-oxygen regulator to increase the supply of the directly supplied oxygen; and an operation of regulating a total recirculated gas amount regulator to decrease the total amount of gases recirculated to thereby increase the boiler-brought-in oxygen density.

Advantageous Effects of Invention

According to a method and an apparatus of controlling exhaust gas in the oxyfuel combustion boiler of the invention, the relationship is obtained in advance between the fuel ratio and/or the carbon content coal, and the rate of the directly supplied oxygen to the boiler-brought-in oxygen density and/or the total oxygen amount, that are obtained when the coal burns stably by burning the coal with oxygen; and the total amount of gases recirculated and/or the supply of the directly supplied oxygen are regulated such that the rate of the directly supplied oxygen to the boiler-brought-in oxygen density and/or the total oxygen amount becomes the rate that corresponds to the fuel ratio and/or the carbon content that are measured in advance for a new kind of coal when the kind of coal is changed to the new one. Therefore, an excellent effect may be achieved that stable combustion with oxygen in the boiler is secured even when the properties of the coal are varied.

Figure 1:
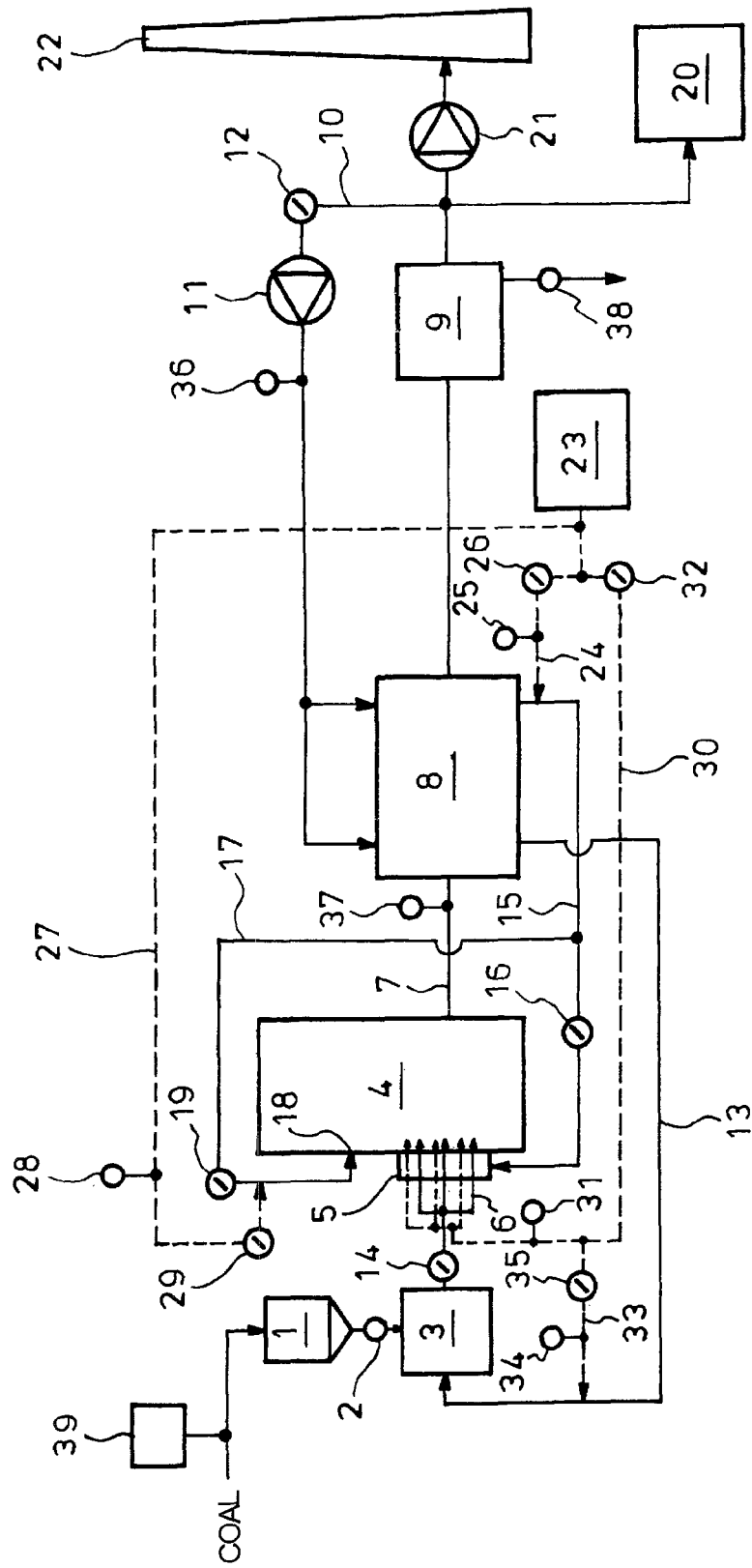
FIG. 1 is a schematic whole configuration of an embodiment of the invention.

REFERENCE SIGNS LIST 3 mill
4 oxyfuel combustion boiler (boiler)
5 wind box
6 burner
10 recirculation branch line
12 total gas amount regulator
13 primary recirculation line
15 secondary recirculation line
17 OAP recirculation line
18 OAP (over air port)
23 air separation unit
24 secondary oxygen mixing line
26 secondary oxygen regulator
27 OAP oxygen mixing line
29 OAP oxygen regulator
30 direct oxygen feed line
32 direct oxygen regulator
33 primary oxygen mixing line
35 primary oxygen regulator
37 $NO_x$ density monitor
38 unburned combustible measuring means
39 fuel measuring means
40 controller
$X_1$ relationship between fuel ratio and boiler-brought-in oxygen density
$X_1'$ relationship between carbon content and boiler-brought-in oxygen density
$X_2$ relationship between fuel ratio and rate of directly supplied oxygen to total oxygen amount
$X_2'$ relationship between carbon content and rate of directly supplied oxygen to total oxygen amount

DESCRIPTION OF EMBODIMENT

An embodiment of the invention will be described with reference to the accompanying drawings.

FIG. 1 shows the embodiment of the invention in which reference numeral 1 denotes a coal bunker for storage of coal; 2, a coal feeder for feeding of the coal stored in the bunker 1; 3, a mill for pulverization and drying of the coal from the feeder 2; 4, an oxyfuel combustion boiler; 5, a wind box attached to the boiler 4; 6, a burner arranged in the wind box 5 for burning the pulverized coal from the mill 3; 7, an exhaust gas line through which an exhaust gas from the boiler 4 flows; 8, an air preheater for heat exchanges of an exhaust gas flowing in the exhaust gas line 7 with primary and secondary recirculated exhaust gases; 9, exhaust gas treating devices such as a desulfurization device and a dust collector which treat the exhaust gas having passed through the air preheater 8; 10, a recirculation branch line for taking out a portion of the exhaust gas having been cleaned by the exhaust gas treating devices 9; 11, a forced draft fan (FDF) disposed in the branch line 10; 12, a total gas amount regulator for regulating a total amount of gas recirculated to the branch line 10; 13, a primary recirculation line for preheating, using the air preheater 8, a portion of the exhaust gas pumped by the forced draft fan 11 to lead the same as primary recirculated gas to the mill 3; 14, a primary gas regulator for regulating a flow rate of the primary recirculated gas; 15, a secondary recirculation line for preheating, using the air preheater 8, the rest of the exhaust gas pumped by the forced draft fan 11 to lead the same as secondary recirculated gas to the wind box 5; 16, a secondary gas regulator for regulating a flow rate of the secondary recirculated gas; 17, an OAP (Over Air Port) recirculation line for introduction of a portion of the exhaust gas branched from the secondary recirculation line 15 into an OAP 18 of the boiler 4; 19, an OAP gas regulator for regulating a flow rate of an OAP recirculation gas; 20, a capture device for taking therein the exhaust gas cleaned by the exhaust gas treating devices 9 to capture $CO_2$, etc., from the exhaust gas; 21, an induced draft fan (IDF) disposed downstream of the exhaust gas treating devices 9 for inducing the exhaust gas; and 22, a stack through which the exhaust gas cleaned by the exhaust gas treating devices 9 and induced by the induced draft fan 21 is discharged to the atmosphere.

In the above configuration, an air separation unit 23 is further provided which takes therein air to produce oxygen. A portion of the oxygen produced by the air separation unit 23 is fed as secondary oxygen to the secondary recirculation line 15 via a secondary oxygen mixing line 24 which is provided with a secondary oxygen meter 25 and a secondary oxygen regulator 26 for measuring and regulating a flow rate in the line 24, respectively. Exemplified in the illustrated embodiment is a case where the secondary oxygen is supplied to the secondary recirculation line 15 downstream of the air preheater 8; alternatively, the secondary oxygen may be supplied upstream of the air preheater 8.

Another portion of the oxygen produced by the air separation unit 23 is supplied as OAP supplied oxygen to the OAP recirculation line 17 through an OAP oxygen mixing line 27 which is provided with an OAP oxygen meter 28 and an OAP oxygen regulator 29 for measuring and regulating a flow rate in the line 27, respectively.

Yet another portion of the oxygen produced by the air separation unit 23 is supplied to the mill 3 and the burner 6. Specifically, a direct oxygen feed line 30 is provided for branching of the oxygen produced by the air separation unit 23 from the secondary oxygen and is provided with a direct oxygen meter 31 and a direct oxygen regulator 32 for measuring and regulating a flow rate in the line 30, respectively. Further, a primary oxygen mixing line 33 branches from the direct oxygen feed line 30 and is provided with a primary oxygen meter 34 and a primary oxygen regulator 35 for measuring and regulating a flow rate in the line 33, respectively. Thus, by regulating the primary oxygen regulator 35, a yet another portion of the oxygen is supplied as primary oxygen to the mill 3 through the primary recirculation line 13 and the rest of the oxygen is supplied to the burner 6 through the direct oxygen feed line 30.

In the above, by regulating the primary oxygen regulator 35, the secondary oxygen regulator 26, the OAP oxygen regulator 29 and the direct oxygen regulator 32, the oxygen produced by the air separation unit 23 may be regulated into amounts of an arbitrary supply ratio of the primary oxygen supplied to the primary recirculation line 13, the secondary oxygen supplied to the secondary recirculation line 15, the OAP oxygen supplied to the OAP recirculation line 17 and the directly supplied oxygen supplied directly to the burner 6.

In the Figure, reference numeral 36 denotes a total exhaust gas amount meter which measures a total amount of exhaust gas recirculated by the recirculation branch line 10. The total amount of the exhaust gas recirculated is regulated by a total gas amount regulator 12 disposed in the recirculation branch line 10 so that a boiler-brought-in oxygen density which represents an oxygen density for the total amount of gas introduced into the boiler 4, can be arbitrary regulated.

Further provided are a $NO_x$ density monitor 37 which measures a $NO_x$ density of the exhaust gas at an outlet of the oxyfuel combustion boiler 4, unburned combustible measuring means 38 which measures and obtains an amount of unburned combustibles in the exhaust gas using the ash obtained by the dedusting by the exhaust gas treating devices 9 and fuel measuring means 39 which measures and obtains a fuel ratio and/or a carbon content of coal supplied to the coal bunker 1. As the unburned combustible measuring means 38, a device capable of automatically measuring the amount of the unburned combustibles may be used; alternatively, generally and conventionally executed manual analysis may be used. As the fuel measuring means 39, a device capable of automatically measuring the fuel ratio and/or the carbon content may be used; alternatively, generally and conventionally executed manual analysis may be used.

As to the coal supplied to the coal bunker 1, its fuel ratio (FR) and/or its carbon content is obtained in advance by the fuel measuring means 39. A relationship is experimentally obtained, in advance, between a fuel ratio and/or a carbon content of the coal on one hand and a boiler-brought-in oxygen density on the other hand when the coal is stably burned with oxygen in the boiler 4. A relationship is also experimentally obtained, in advance, between a fuel ratio and/or a carbon content on one hand and a rate of directly supplied oxygen to a total oxygen amount on the other hand.

When the boiler 4 is started up, air (not shown) is introduced into the mill 3 instead of the primary recirculated gas to dry the coal charged into the mill 3 and transport the coal pulverized to the burner 6. Air (not shown) in place of the oxygen is supplied to the wind box 5 of the boiler 4 to execute air combustion of the pulverized coal in the boiler 4. When heat absorption of the boiler 4 reaches a predetermined value, shift to oxyfuel combustion is effected by switching the supply of the air into the supply of oxygen or recirculated gas.

In oxyfuel combustion of coal by the oxyfuel combustion boiler 4, oxygen is supplied in an amount corresponding to the supply of the coal by the air separation unit 23 such that the shape of flames by the burner 6, the boiler heat absorption, the $NO_x$ density, the unburned combustibles, etc., are maintained in their predetermined states. In addition, each of the primary recirculated exhaust gas necessary for conveying the pulverized coal, the secondary recirculated exhaust gas to be supplied to the wind box 5 and the OAP recirculation exhaust gas to be supplied to the OAP 18 is regulated, and the total gas amount which is sum of the amounts of these recirculated exhaust gases is regulated by the total gas amount regulator 12, whereby stable combustion is executed in the oxyfuel combustion boiler 4.

The fuel ratio (FR) and/or the carbon content of coal is first taken into consideration as the factor which causes the combustion state of the boiler to vary and which, thereby, causes unstable combustion to occur due to a change of the kind of the coal burned in the oxyfuel combustion boiler 4. The fuel ratio and the carbon content are used substantially similarly for the combustion of coal and, therefore, in the control of the invention, one of the fuel ratio and the carbon content or both of them may be used. It has turned out that controlling the boiler-brought-in oxygen density and/or the rate of the directly supplied oxygen to the total oxygen amount from the air separation unit 23 is effective to obtain stable combustion in the oxyfuel combustion boiler 4 even when the fuel ratio and/or the carbon content of the coal varies.

Therefore, the fuel ratio of coal is first measured in advance by the fuel measuring means 39, and the relationship is obtained in advance by calculation between the fuel ratio and the boiler-brought-in oxygen density obtained when the coal is stably burned with oxygen in the boiler 4. Thereby, a point $P_1$ of FIG. 4(a) is obtained.

The above operation is executed for each of other one or more kinds of coal and, thereby, one or more points $P_2$ are obtained as in FIG. 4(a). Thereby, a relationship $X_1$ is obtained in advance between the fuel ratio and the boiler-brought-in oxygen density when the coal is burned stably.

Similarly, as shown in FIG. 4(b), a relationship $X_2$ is obtained between the fuel ratio and the rate of the directly supplied oxygen to the burner 6 to the total oxygen amount from the air separation unit 23. When the carbon content is used instead of the fuel ratio, relationships $X_1'$ and $X_2'$ are obtained which approximate the relationships $X_1$ and $X_2$ shown in FIGS. 4(a) and 4(b). Therefore, prior to the control, at least one of the relationships $X_1$, $X_1'$, $X_2$ and $X_2'$ shown in FIGS. 4(a) and 4(b) is measured.

Figure 2:
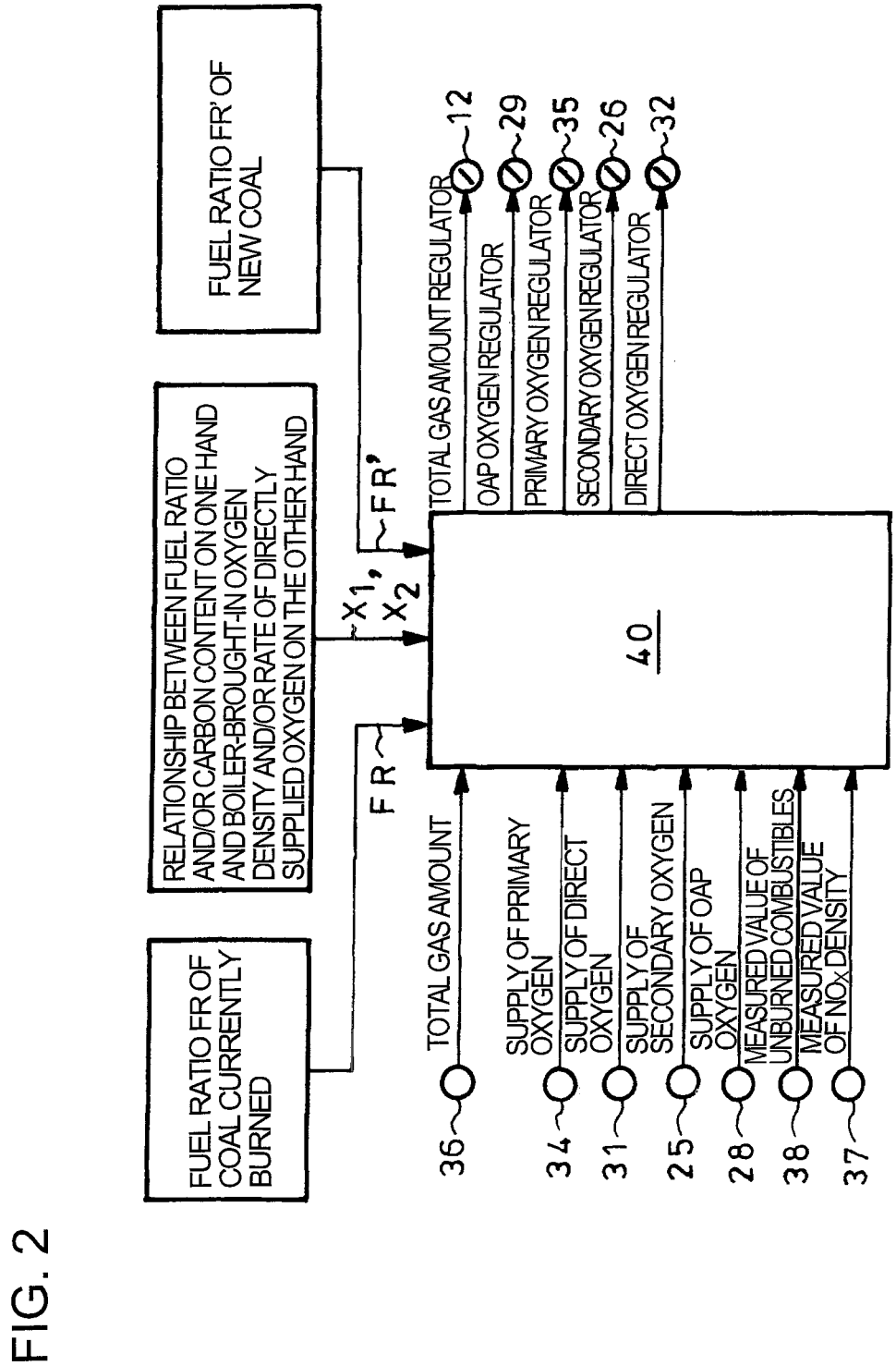
FIG. 2 is a block diagram of an example of a controller in the embodiment of the invention.

FIG. 2 is a diagram of an example of a controller 40 to enable stable combustion with oxygen even when the properties of coal (the fuel ratio FR, the carbon content) are varied in the oxyfuel combustion boiler of FIG. 1. The controller 40 is inputted with the total amount of gas recirculated which is measured by the total gas amount meter 36, the supply of the primary oxygen which is measured by the primary oxygen meter 34, the supply of the directly supplied oxygen which is measured by the direct oxygen meter 31, the supply of the secondary oxygen which is measured by the secondary oxygen meter 25, the supply of the OAP oxygen which is measured by the OAP oxygen meter 28, a value of the unburned combustibles which is measured by the unburned combustible measuring means 38 and a value of the $NO_x$ density which is measured by the $NO_x$ density monitor 37.

Because the fuel ratio and the carbon content may be regarded as substantially same, the description will hereinafter be made taking an example of a case where the fuel ratio is used for control so as to simplify the description. However, control using the carbon content may be similarly executed.

The controller 40 is inputted with the relationship $X_1$ between the fuel ratio of the coal and the boiler-brought-in oxygen density and/or the relationship $X_2$ between the fuel ratio of the coal and the rate of the directly supplied oxygen which are measured in advance as above and are shown in FIGS. 4(a) and 4(b). The controller 40 is also inputted with the fuel ratio (FR) of the coal currently burned which is measured in advance by the fuel measuring means 39 and a fuel ratio (FR') of new kind of coal to be burned next, which is measured in advance.

The controller 40 is adapted to output a control signal to regulate the total gas amount regulator 12, a control signal to regulate the OAP oxygen regulator 29, a control signal to regulate the primary oxygen regulator 35, a control signal to regulate the secondary oxygen regulator 26 and a control signal to regulate the direct oxygen regulator 32.

On the other hand, the unburned combustibles in the ash discharged together with the exhaust gas from the oxyfuel combustion boiler 4 are directly related to boiler efficiency and, therefore, their amount need to be controlled to be lower than a predetermined unburned combustible limit value. Some unburned combustible limit values are 5% or less as practical cases. However, for example in a case where the ash is used as a material for cement, the unburned combustibles in the ash may be limited according to the purpose of use of the ash. Therefore, the unburned combustible limit value is set corresponding to circumstances.

Figure 3:
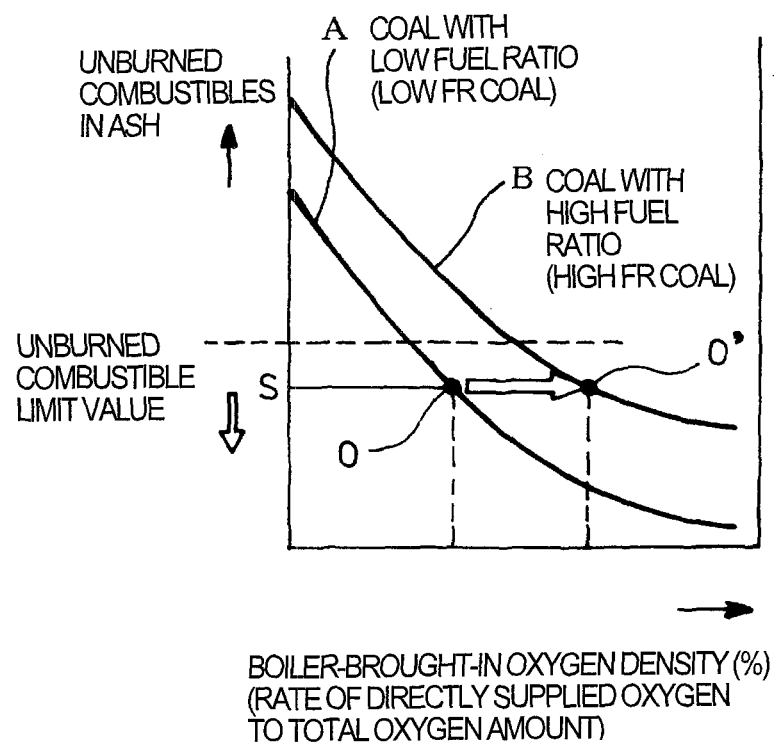
FIG. 3 is a graph on a relationship between boiler-brought-in oxygen density and amount of unburned combustibles.

FIG. 3 shows the relationship between the boiler-brought-in oxygen density or the rate of the directly supplied oxygen to the total oxygen amount on one hand and the unburned combustibles on the other hand obtained as a result of combustion tests on coal A (low FR coal) having a low fuel ratio and coal B (high FR coal) having a high fuel rate which are executed in the oxyfuel combustion boiler 4 of FIG. 1. It is seen in FIG. 3 that the coal B (high FR coal) having the high fuel ratio produces significantly increased amount of unburned combustibles compared to the coal A (low FR coal) having the low fuel ratio. In FIG. 3, relative to a boiler-brought-in oxygen density O or a rate O of directly supplied oxygen to a total oxygen amount obtained when a predetermined unburned combustible set value S is maintained with the coal A (low FR coal) having a low fuel ratio, in order to maintain the same unburned combustible set value S with the coal B (high FR coal) having a high fuel ratio, it is necessary for the boiler-brought-in oxygen density or the rate of the directly supplied oxygen to the total oxygen amount to be increased like O'.

The controller 40 is inputted in advance with the relationship $X_1$ between the fuel ratio of the coal and the boiler-brought-in oxygen density and/or the relationship $X_2$ between the fuel ratio and the rate of the directly supplied oxygen to the total oxygen amount, which is obtained in advance and with which stable combustion is achieved. As a result, by inputting into the controller 40 the fuel ratio (FR') measured in advance of the new kind of coal to be burned in the boiler 4, the controller 40 is adapted to execute automatic control. More specifically, when the fuel ratio (FR') of the coal is high, the controller 40 is caused to regulate the total gas amount regulator 12 to reduce the total amount of gases recirculated to thereby increase the boiler-brought-in oxygen density, or to regulate the direct oxygen regulator 32, the secondary oxygen regulator 26 and the primary oxygen regulator 35 to increase the rate of the directly supplied oxygen, or to execute both of them; when the fuel ratio (FR') of the coal is low, the controller 40 is caused to regulate the total gas amount regulator 12 to increase the total amount of gases recirculated to thereby reduce the boiler-brought-in oxygen density, or to regulate the direct oxygen regulator 32, the secondary oxygen regulator 26 and the primary oxygen regulator 35 to reduce the rate of the directly supplied oxygen, or to execute both of them.

In this manner, in accordance with the fuel ratio (FR') of the new kind of coal, the total amount of gases recirculated is properly regulated to regulate the boiler-brought-in oxygen density and/or the rate of directly supplied oxygen is properly regulated, so that the amount of the unburned combustibles shown in FIG. 3 can be stably maintained at a predetermined unburned combustible set value S lower than the unburned combustible limit value even when the kind of coal is changed.

Figure 5:
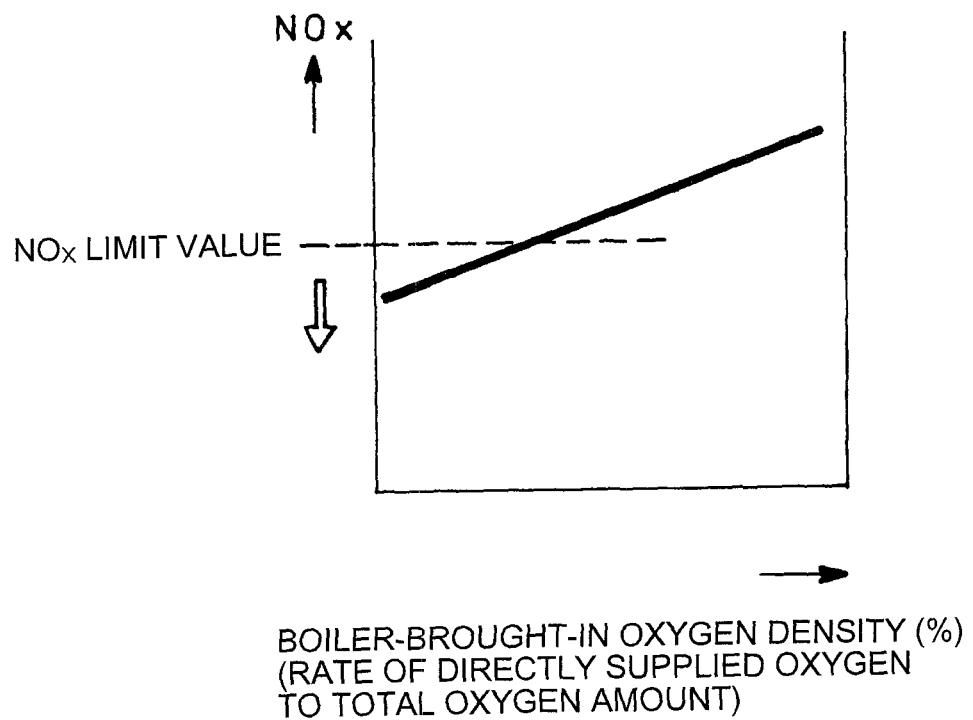
FIG. 5 is a graph on a relationship between boiler-brought-in oxygen density and $NO_x$ density.

The $NO_x$ density of the exhaust gas also needs to be maintained to be lower than a predetermined $NO_x$ limit value. When a research was executed on the relationship between the boiler-brought-in oxygen density or the rate of the directly supplied oxygen on one hand and the $NO_x$ density of the exhaust gas on the other hand, the fact was obtained which the $NO_x$ density substantially linearly increased in association with an increase of the boiler-brought-in oxygen density or the rate of the directly supplied oxygen as shown in FIG. 5. The $NO_x$ limit value is limited, for example, by a regulation on a $NO_x$ density or a total emission in a power station and, for example, 180 ppm with which a practical case is present in terms of conversion into a density at a boiler outlet may be employed as a $NO_x$ limit value.

Thus, in addition to the control of regulating the total amount of gases recirculated to vary the boiler-brought-in oxygen density, using the total gas amount regulator 12, and/or the control of varying the rate of the directly supplied oxygen, the controller 40 is adapted to regulate the OAP oxygen regulator 29 to control the supply of the OAP supplied oxygen to the OAP recirculation line 17 such that the amount of unburned combustibles measured by the unburned combustible measuring means 38 is maintained at a value lower than the unburned combustible limit value and that the $NO_x$ density measured by the $NO_x$ density monitor 37 is maintained at a value lower than the $NO_x$ limit value.

In addition to the above controls, the controller 40 is further adapted to regulate the primary oxygen regulator 35 to thereby control the supply of the primary oxygen to the primary recirculation line 13 for stable combustion in the burner 6.

Figure 6:
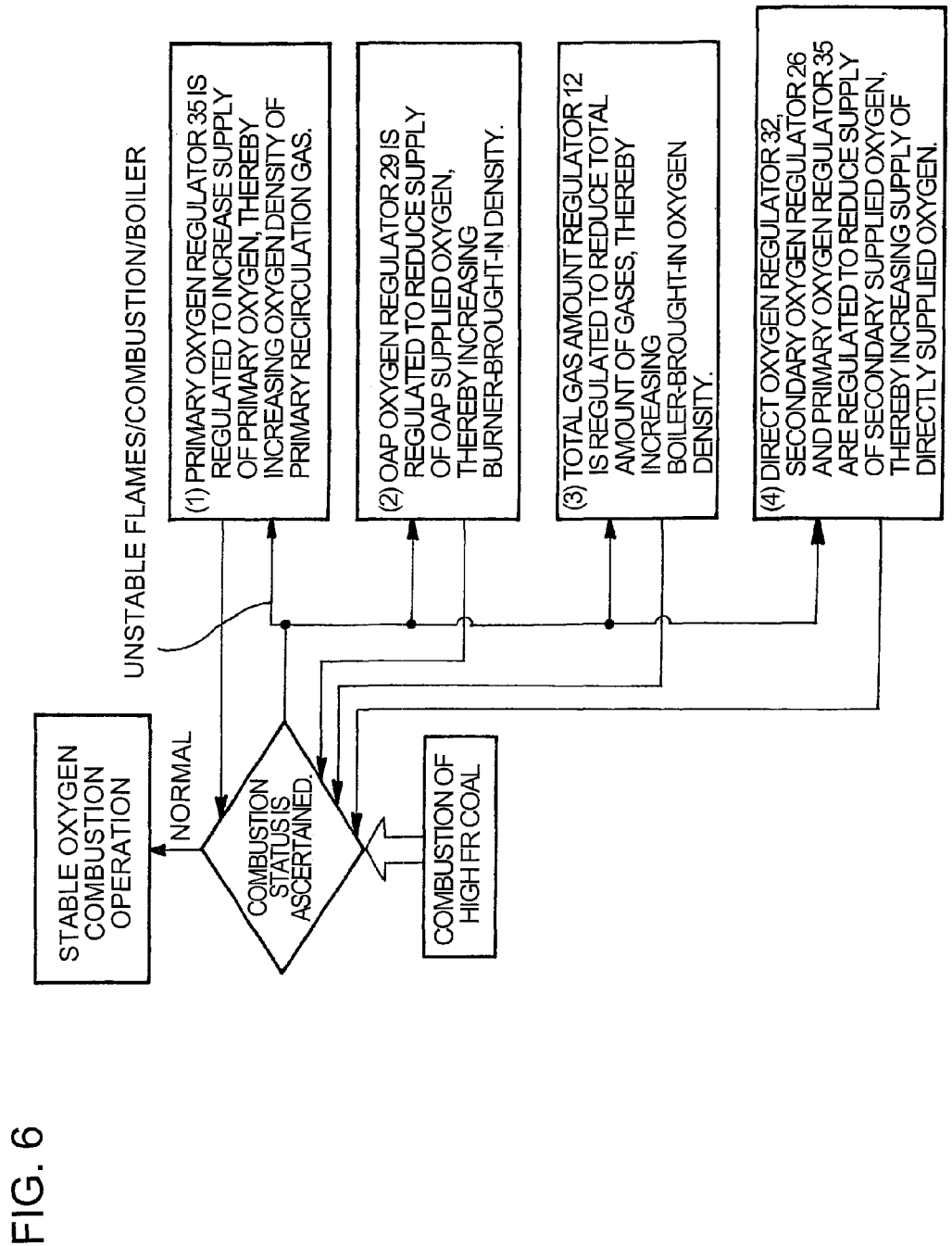
FIG. 6 is a block diagram of a control method for a case where burner flames become unstable.

When burner flames become unstable due to switching of the combustion of the standard coal A to the combustion of the new kind of coal B as shown in FIG. 6, the controller 40 is adapted to execute at least one of the following operations: to regulate the primary oxygen regulator 35 to increase the supply of the primary oxygen to the primary recirculation line 13; to regulate the OAP oxygen regulator 29 to reduce the supply of the OAP supplied oxygen to the OAP recirculation line 17 to thereby increase the burner-brought-in oxygen density; to regulate the total gas amount regulator 12 to reduce the total amount of gases recirculated to thereby increase the boiler-brought-in oxygen density; and to regulate the direct oxygen regulator 32, the secondary oxygen regulator 26 and the primary oxygen regulator 35 to increase the rate of the directly supplied oxygen. The burner-brought-in oxygen density represents the oxygen density for the total amount of gases introduced into the burner 6.

Operations of the illustrated embodiment will be described.

In the oxyfuel combustion boiler 4 as above, the coal stored in the coal bunker 1 is first measured with respect to its fuel ratio (FR) by the fuel measuring means 39. The coal whose fuel ratio (FR) has been measured is charged by the coal feeder 2 into the mill 3 where the coal is pulverized into pulverized coal. The primary recirculated exhaust gas which is a portion of the exhaust gas taken out by the forced draft fan 11 (FDF) downstream of the exhaust gas treating devices 9 is introduced into the mill 3 through the primary recirculation line 13. The primary recirculated exhaust gas dries the coal charged into the mill 3 and conveys the coal pulverized to the burner 6 of the boiler 4.

Another portion of the exhaust gas from the forced draft fan 11 is supplied to the wind box 5 of the boiler 4 through the secondary recirculation line 15 as the secondary recirculated exhaust gas. The rest of the exhaust gas, which is taken out through the OAP recirculation line 17 branching from the secondary recirculation line 15, is supplied to the OAP 18 of the boiler 4 as the OAP recirculation gas.

A portion of oxygen produced by the air separation unit 23 is supplied to the secondary recirculation line 15 through the secondary oxygen mixing line 24 as the secondary oxygen, and another portion of the oxygen is supplied to the OAP recirculation line 17 through the OAP oxygen mixing line 27 as the OAP oxygen. Yet another portion of the oxygen is supplied to the primary recirculation line 13 through the primary oxygen mixing line 33 branching from the direct oxygen feed line 30 as the primary oxygen, and the rest of the oxygen is supplied directly to the burner 6 through the direct oxygen feed line 30 as the direct oxygen.

Thus, the pulverized coal supplied by the primary recirculated exhaust gas from the mill 3 to the burner 6 is burned by the primary recirculated gas mixed with oxygen and supplied to the burner 6, the secondary recirculated gas mixed with oxygen and supplied to the wind box 5, the OAP recirculation gas mixed with oxygen and supplied to the OAP 18 and the directly supplied oxygen supplied directly to the burner 6. The exhaust gas produced by the combustion preheats the primary and secondary recirculated exhaust gases using the air preheater 8 and is treated by the exhaust gas treating devices 9. Thereafter, the exhaust gas is partly led to the forced draft fan 11 for recirculation as recirculated exhaust gas and to a capture device 20 which captures $CO_2$, etc. The rest of the exhaust gas is induced by the induced draft fan (IDF) and is discharged through a stack 22 to the atmosphere.

In the oxyfuel combustion of coal by the oxyfuel combustion boiler 4, in order to maintain the shape of flames by the burner 6, the boiler heat absorption, the $NO_x$ density, the unburned combustibles, etc., in their predetermined states, the supply of the oxygen produced by the air separation unit 23 is adjusted in accordance with to the supply of the coal (pulverized coal) and, in addition, each of the primary recirculated exhaust gas necessary for conveying the pulverized coal, the secondary recirculated exhaust gas supplied to the wind box 5 and the OAP recirculation exhaust gas supplied to the OAP 18 is regulated and the total amount of gases which is a sum of the amounts of these recirculated exhaust gases is regulated by the total gas amount regulator 12, so that stable combustion is executed in the oxyfuel combustion boiler 4.

Upon such stable combustion in the boiler 4, the boiler-brought-in oxygen density is obtained by calculation on the basis of the amount of oxygen supplied from the air separation unit 23 to the boiler 4, and a rate of the directly supplied oxygen to the total oxygen amount is determined.

Same operation as above is executed on at least other one or more kinds of coal, and the relationship $X_1$, $X_2$ between the fuel ratio and the boiler-brought-in oxygen density and/or between the fuel ration and the rate of the directly supplied oxygen obtained when the coal is stably burned is inputted into the controller 40 in FIG. 2.

When a new kind of coal is to be burned which is different from the coal burned currently in the oxyfuel combustion boiler 4, the fuel ratio of the new kind of coal (FR') measured in advance by the fuel measuring means 39 is inputted into the controller 40.

Figure 4:
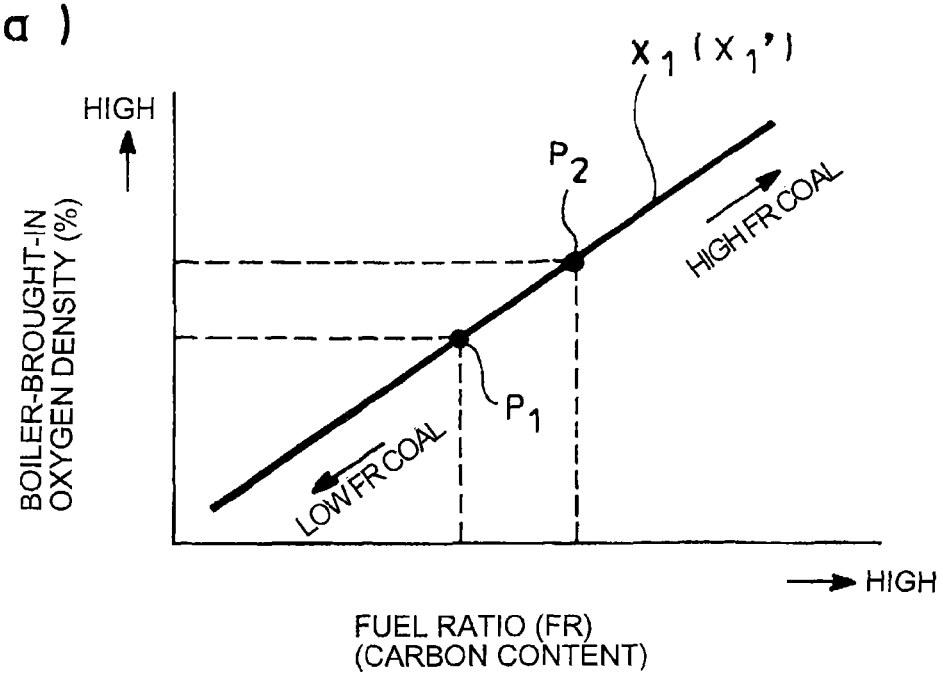
FIG. 4($a$) is a graph on a relationship between fuel ratio of coal and boiler-brought-in oxygen density and FIG. 4($b$) is a graph on a relationship between fuel ratio of coal and rate of directly supplied oxygen to total oxygen amount.
Figure 4:
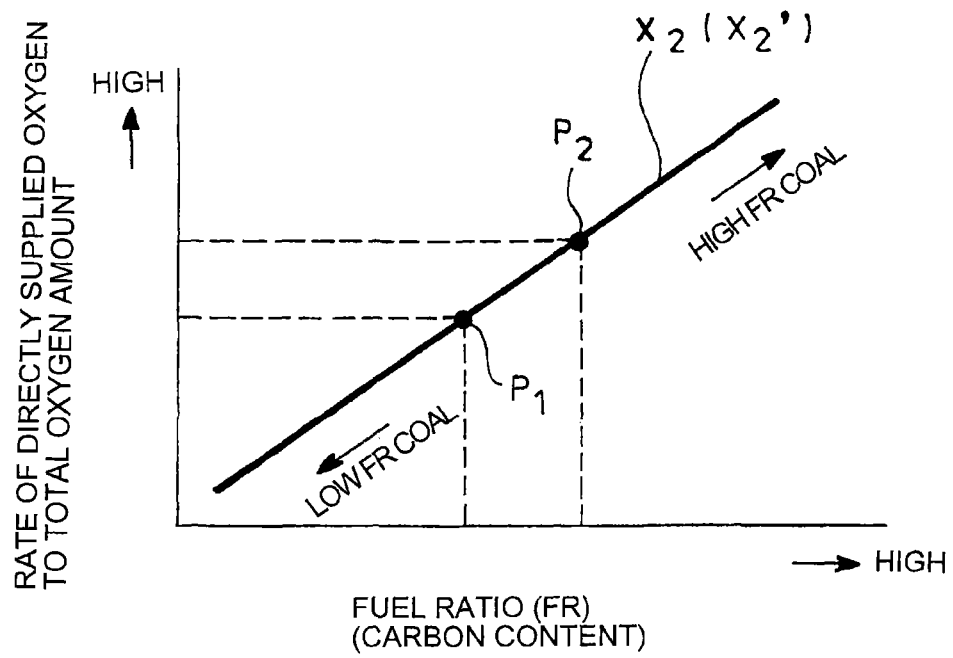

Thereby, when the kind of coal supplied is changed, the controller 40 automatically executes one or both of the control of regulating the total gas regulator 12 to regulate the total amount of gases recirculated and the control of regulating the direct oxygen regulator 32, the secondary oxygen regulator 26 and the primary oxygen regulator 35 to regulate the rate of the directly supplied oxygen, on the basis of the relationship $X_1$, $X_2$ shown in FIG. 4 between the fuel ratio (FR) and the boiler-brought-in oxygen density and/or between the fuel ratio (FR) and the rate of the directly supplied oxygen, such that the boiler-brought-in oxygen density and/or the rate of the directly supplied oxygen is obtained which accords with the fuel ratio (FR').

Thus, in accordance with the fuel ratio (FR) of the coal, the total amount of gases recirculated may be properly regulated to regulate the boiler-brought-in oxygen density and/or the rate of the directly supplied oxygen may be properly regulated to regulate the supply of the directly supplied oxygen, so that the amount of the unburned combustibles may be stably maintained at a predetermined unburned combustible set value S lower than the unburned combustible limit value even when the kind of coal to be supplied to the boiler 4 is changed.

In addition to the control of regulating the total amount of gases recirculated by the total gas amount regulator 12 to vary the boiler-brought-in oxygen density, the controller 40 controls the supply of the OAP supplied oxygen supplied to the OAP recirculation line 17 by regulating the OAP oxygen regulator 29 such that the amount of the unburned combustibles measured by the unburned combustible measuring means 38 is maintained to be lower than the unburned combustibles limit value and the $NO_x$ density measured by the $NO_x$ density monitor 37 is maintained to be lower than the $NO_x$ limit value. Thereby, even when the kind of coal is changed, control is automatically executed such that the amount of the unburned combustibles is maintained to be lower than the unburned combustible limit value and the $NO_x$ density is maintained to be lower than the $NO_x$ limit value.

In addition to the above controls, when stable combustion is attained for the burner 6 by regulating the primary oxygen regulator 35 to regulate the supply of the primary oxygen to be supplied to the primary recirculation line 13, the controller 40 may effectively control the shape of the flames of the burner 6 by regulating the supply ratio of the supply of the secondary oxygen to the secondary recirculation line 15 regulated by regulating the secondary oxygen regulator 26 and the supply of the directly supplied oxygen supplied directly to the burner 6 regulated by regulating the direct oxygen regulator 32. Thereby, even when the kind of coal is changed, stable combustion may be obtained without causing a problem of flaming off which is so serious that the burner flames are blown off, and the shape of the flames of the burner 6 may be stably maintained in a predetermined shape.

As shown in FIG. 6, when the burner flames become unstable by switching the combustion of a standard coal A to the combustion of a new coal B, the controller 40 executes at least one of: an operation of regulating the primary oxygen regulator 35 to increase the supply of the primary oxygen supplied to the primary recirculation line 13; an operation of regulating the OAP oxygen regulator 29 to reduce the supply of the OAP supplied oxygen supplied to the OAP recirculation line 17, thereby increasing the burner-brought-in oxygen density; an operation of regulating the total gas amount regulator 12 to reduce the total amount of gases recirculated, thereby increasing the boiler-brought-in oxygen density; and an operation of regulating the direct oxygen regulator 32, the secondary oxygen regulator 26 and the primary oxygen regulator 35 to reduce the supply of the secondary oxygen, thereby increasing the supply of the direct oxygen. Thereby, even when the kind of coal is changed, stable oxyfuel combustion operation may be maintained.

It is to be understood that a method and an apparatus of controlling oxygen supply in an oxyfuel combustion boiler of the invention is not limited to the illustrated embodiment and that various changes and modifications may be made without departing from the scope of the invention.

INDUSTRIAL APPLICABILITY

Even when properties of coal are changed, stable combustion can be obtained in an oxyfuel combustion boiler in a state where the properties of exhaust gas are controlled within their limit values.

The invention claimed is:

1. A method of controlling oxygen supply in an oxyfuel combustion boiler wherein a portion of an exhaust gas recirculated is introduced into a mill as primary recirculated exhaust gas; pulverized coal pulverized by said mill is supplied to a burner of the boiler by the primary recirculated exhaust gas; another portion of the exhaust gas recirculated is supplied to a wind box of the boiler as secondary recirculated exhaust gas; the rest of the exhaust gas recirculated is supplied to an OAP as OAP recirculation exhaust gas; a portion of oxygen produced by an air separation unit is supplied to the primary recirculated exhaust gas as primary oxygen; another portion of the oxygen is supplied to the secondary recirculated exhaust gas as secondary oxygen; yet another portion of the oxygen is supplied to the OAP recirculation exhaust gas as OAP supplied oxygen; and the rest of the oxygen is supplied directly to the burner as directly supplied oxygen, said method comprising:
inputting predetermined relationships into a controller, the relationships being determined by
measuring at least one of a fuel ratio and a carbon content of coal;
obtaining by calculation, upon stable combustion of the coal in the boiler, a point $P_1$ representing a relationship between at least one of the fuel ratio and a boiler-brought-in oxygen density or the carbon content of coal and the boiler-brought-in oxygen density;
executing the same operation as the operation to obtain the point $P_1$ for each of one or more kinds of coal to obtain one or more points $P_2$, and obtaining from a line connecting the points $P_1$ and $P_2$ a first relationship between at least one of the fuel ratio and the boiler-brought-in oxygen density or the carbon content of coal and the boiler-brought-in oxygen density;
obtaining by calculation, upon stable combustion of the coal with at least one of the fuel ratio and the carbon content of coal having been measured in the boiler, a further point $P_1$ representing a relationship between at least one of the fuel ratio and a rate of the directly supplied oxygen to the burner to a total oxygen amount from the air separation unit or the carbon content of coal and the rate of the directly supplied oxygen to the burner to the total oxygen amount from the air separation unit; and
executing the same operation as the operation to obtain the further point $P_1$ for each of one or more kinds of coal to obtain one or more further points $P_2$, and obtaining from a line connecting the further points $P_1$ and $P_2$ a second relationship between at least one of the fuel ratio and the rate of the directly supplied oxygen to the total oxygen amount or the carbon content of coal and the rate of the directly supplied oxygen to the total oxygen amount;

and
controlling, using the controller inputted with the predetermined relationships, the oxygen supply in the oxyfuel combustion boiler based on at least one of the fuel ratio and the carbon content of the coal,
wherein a total amount of gases recirculated is reduced to increase the boiler-brought-in oxygen density, or the rate of the directly supplied oxygen to the total oxygen amount is increased in case that at least one of the fuel ratio and the carbon content of coal is higher than a predetermined value, using the controller, and
wherein the total amount of gases recirculated is increased to reduce the boiler-brought-in oxygen density, or the rate of the directly supplied oxygen to the total oxygen amount is reduced in case that at least one of the fuel ratio and the carbon content of coal is lower than the predetermined value, using the controller.

2. A method of controlling oxygen supply in an oxyfuel combustion boiler as claimed in claim 1, wherein, when flames in the burner are unstable, executed is at least one of: an operation of increasing the supply of the primary oxygen to the primary recirculated exhaust gas; an operation of reducing the supply of the OAP supplied oxygen to the OAP recirculation exhaust gas to increase a burner-brought-in oxygen density; an operation of increasing a supply of the directly supplied oxygen; and operation of decreasing the total amount of gases recirculated to increase the boiler-brought-in oxygen density.

3. A method of controlling oxygen supply in an oxyfuel combustion boiler as claimed in claim 1, wherein a supply of the OAP supplied oxygen to the OAP recirculation exhaust gas is controlled such that an amount of unburned combustibles is maintained at a value lower than an unburned combustibles limit value and that a NOx density is maintained at a value lower than a NOx limit value.

4. A method of controlling oxygen supply in an oxyfuel combustion boiler as claimed in claim 3, wherein, when flames in the burner are unstable, executed is at least one of: an operation of increasing the supply of the primary oxygen to the primary recirculated exhaust gas; an operation of reducing the supply of the OAP supplied oxygen to the OAP recirculation exhaust gas to increase a burner-brought-in oxygen density; an operation of increasing a supply of the directly supplied oxygen; and operation of decreasing the total amount of gases recirculated to increase the boiler-brought-in oxygen density.

5. A method of controlling oxygen supply in an oxyfuel combustion boiler as claimed in claim 1 or 3, wherein a supply of the primary oxygen to the primary recirculated exhaust gas is regulated for stable combustion in the burner, and a supply ratio of a supply of the secondary oxygen to the secondary recirculated exhaust gas to a supply of the directly supplied oxygen to the burner is regulated to control a shape of flames in the burner.

6. A method of controlling oxygen supply in an oxyfuel combustion boiler as claimed in claim 5, wherein, when the flames in the burner are unstable, executed is at least one of: an operation of increasing the supply of the primary oxygen to the primary recirculated exhaust gas; an operation of reducing the supply of the OAP supplied oxygen to the OAP recirculation exhaust gas to increase a burner-brought-in oxygen density; an operation of increasing a supply of the directly supplied oxygen; and operation of decreasing the total amount of gases recirculated to increase the boiler-brought-in oxygen density.

7. An apparatus of controlling oxygen supply in an oxyfuel combustion boiler having a primary recirculation line for introduction of a portion of an exhaust gas taken out by a recirculation branch line to a mill as primary recirculated exhaust gas and for supply of pulverized coal pulverized by the mill to a burner of the boiler using the primary recirculated exhaust gas, a secondary recirculation line for supply of another portion of the exhaust gas recirculated to a wind box of the boiler as secondary recirculated exhaust gas, an OAP recirculation line for supply of the rest of the exhaust gas recirculated to an OAP as OAP recirculation exhaust gas, an air separation unit, a primary oxygen mixing line for supply of a portion of oxygen produced by the air separation unit to said primary recirculation line as primary oxygen, a secondary oxygen mixing line for supply of another portion of the oxygen to the secondary recirculation line as secondary oxygen, an OAP oxygen mixing line for supply of yet another portion of the oxygen to the OAP recirculation line as OAP supplied oxygen, a direct oxygen feed line for supply of the rest of the oxygen directly to the burner as directly supplied oxygen, a total gas amount regulator provided for the recirculation branch line, a primary oxygen regulator provided for the primary oxygen mixing line, a secondary oxygen regulator provided for the secondary oxygen mixing line, an OAP oxygen regulator provided for the OAP oxygen mixing line, a direct oxygen regulator provided for the direct oxygen feed line, a coal measuring device for measuring at least one of a fuel ratio and a carbon content of coal, an unburned combustible measuring device for measurement of unburned combustibles in the exhaust gas using ash obtained by dedusting and a $NO_x$ density monitor for measurement of a $NO_x$ density in the exhaust gas at a boiler outlet, said apparatus comprising:
  a controller inputted with predetermined relationships, the relationships being determined by
    measuring at least one of the fuel ratio and the carbon content of coal by the coal measuring device,
    obtaining by calculation, upon stable combustion of the coal in the boiler, a point $P_1$ representing a relationship between at least one of the fuel ratio and a boiler-brought-in oxygen density or the carbon content of coal and the boiler-brought-in oxygen density,
    executing the same operation as the operation to obtain the point $P_1$ for each of one or more kinds of coal thereafter to obtain one or more points $P_2$, and obtaining from a line connecting the points $P_1$ and $P_2$ a first relationship between at least one of the fuel ratio and the boiler-brought-in oxygen density or the carbon content of coal and the boiler-brought-in oxygen density,
    obtaining by calculation, upon stable combustion of the coal with at least one of the fuel ratio and the carbon content of coal having been measured in the boiler, a further point $P_1$ representing a relationship between at least one of the fuel ratio and a rate of the directly supplied oxygen to the burner to a total oxygen amount from the air separation unit or the carbon content of coal and the rate of directly supplied oxygen to the burner to the total oxygen amount from the air separation unit, and
    executing the same operation as the operation to obtain the further point $P_1$ for each of one or more kinds of coal thereafter to obtain one or more further points $P_2$, and obtaining from a line connecting the further points $P_1$ and $P_2$ a second relationship between at least one of the fuel ratio and the rate of the directly supplied oxygen or the carbon content of coal and the rate of the directly supplied oxygen to the total oxygen amount,
  wherein said controller, inputted with the predetermined relationships, is configured to control the oxygen supply in the oxyfuel combustion boiler based on at least one of the fuel ratio and the carbon content of the coal,
  wherein the controller is configured to perform reducing a total amount of gases recirculated to increase the boiler-brought-in oxygen density, or increasing the rate of directly supplied oxygen to the total oxygen amount in case that at least one of the fuel ratio and the carbon content of the coal is higher than a predetermined value, and
  wherein the controller is configured to perform increasing the total amount of gases recirculated to reduce the boiler-brought-in oxygen density or reducing the rate of the directly supplied oxygen to the total oxygen amount in case that at least one of the fuel ratio and the carbon content of coal is lower than the predetermined value.

8. An apparatus of controlling oxygen supply in an oxyfuel combustion boiler as claimed in claim 7, wherein when flames in the burner are unstable, the controller is adapted to execute at least one of: an operation of regulating the primary oxygen regulator to increase the supply of the primary oxygen to the primary recirculation line; an operation of regulating the OAP oxygen regulator to reduce the supply of the OAP supplied oxygen to the OAP recirculation line to thereby increase the burner-brought-in oxygen density; an operation of regulating the directly-supplied-oxygen regulator to increase the supply of the directly supplied oxygen; and an operation of regulating a total recirculated gas amount regulator to decrease the total amount of gases recirculated to thereby increase the boiler-brought-in oxygen density.

9. An apparatus of controlling oxygen supply in an oxyfuel combustion boiler as claimed in claim 7, wherein the controller is adapted to regulate the OAP oxygen regulator to control the supply of the OAP supplied oxygen to the recirculation line such that the amount of the unburned combustibles measured by the unburned combustible measuring device is maintained at a value lower than an unburned combustible limit value and that the NOx density measured by the NOx density monitor is maintained at a value lower than a NOx limit value.

10. An apparatus of controlling oxygen supply in an oxyfuel combustion boiler as claimed in claim 9, wherein when flames in the burner are unstable, the controller is adapted to execute at least one of: an operation of regulating the primary oxygen regulator to increase the supply of the primary oxygen to the primary recirculation line; an operation of regulating the OAP oxygen regulator to reduce the supply of the OAP supplied oxygen to the OAP recirculation line to thereby increase the burner-brought-in oxygen density; an operation of regulating the directly-supplied-oxygen regulator to increase the supply of the directly supplied oxygen; and an operation of regulating a total recirculated gas amount regulator to decrease the total amount of gases recirculated to thereby increase the boiler-brought-in oxygen density.

11. An apparatus of controlling oxygen supply in an oxyfuel combustion boiler as claimed in claim 7 or 9, wherein the controller is adapted to regulate the primary oxygen regulator to control the supply of the primary oxygen to the primary recirculation line to thereby stabilize the combustion in the burner and is adapted to regulate a supply ratio of the supply of the secondary oxygen to the secondary recirculation line regulated by the secondary oxygen regulator and the supply of the directly supplied oxygen to the burner regulated by the direct oxygen regulator to thereby control a shape of flames in the burner.

12. An apparatus of controlling oxygen supply in an oxyfuel combustion boiler as claimed in claim 11, wherein when the flames in the burner are unstable, the controller is adapted to execute at least one of: an operation of regulating the primary oxygen regulator to increase the supply of the primary oxygen to the primary recirculation line; an operation of regulating the OAP oxygen regulator to reduce the supply of the OAP supplied oxygen to the OAP recirculation line to thereby increase the burner-brought-in oxygen density; an operation of regulating the directly-supplied-oxygen regulator to increase the supply of the directly supplied oxygen; and an operation of regulating a total recirculated gas amount regulator to decrease the total amount of gases recirculated to thereby increase the boiler-brought-in oxygen density.

\* \* \* \* \*